UNITED STATES PATENT OFFICE.

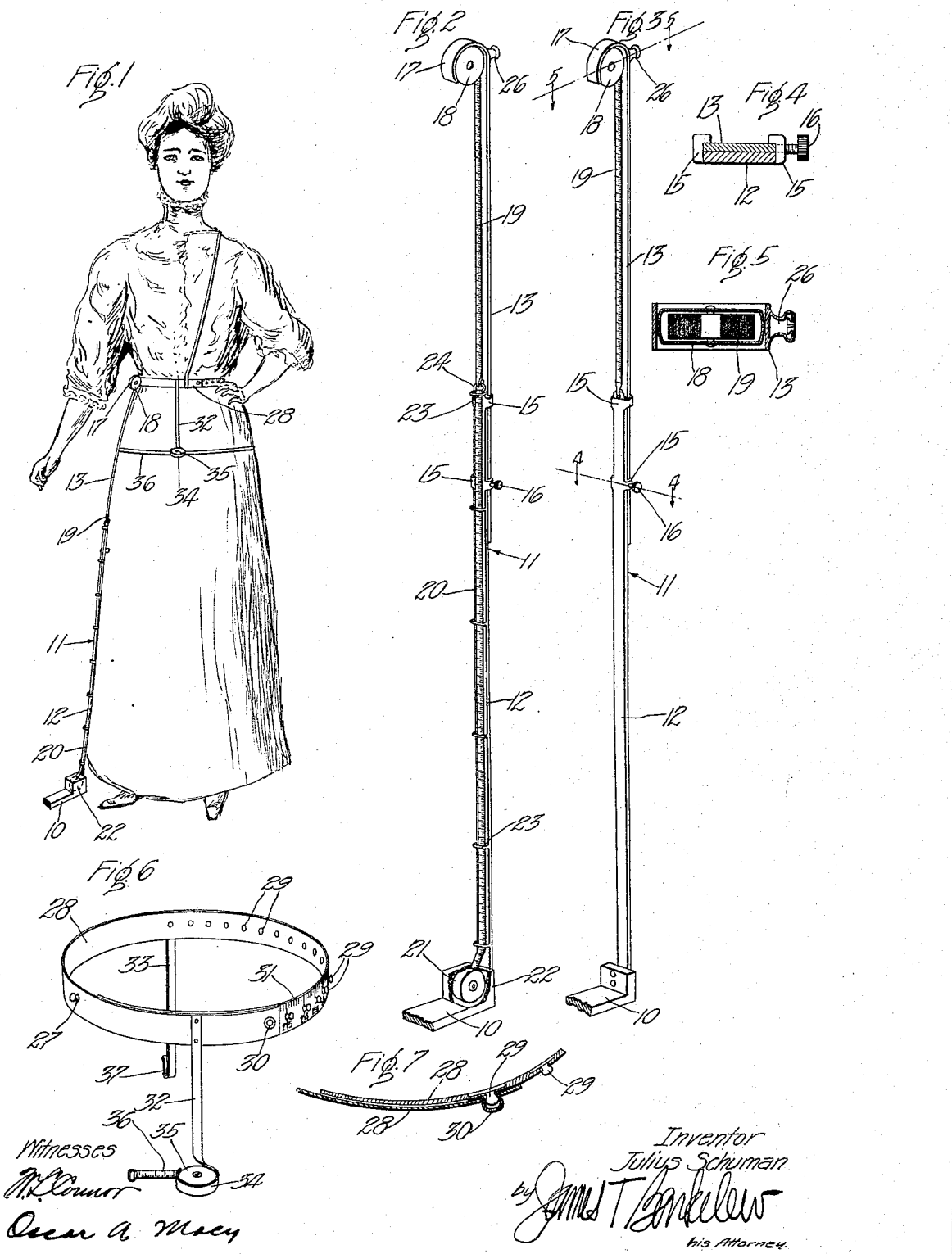

JULIUS SCHUMAN, OF LOS ANGELES, CALIFORNIA.

MEASURING INSTRUMENT.

1,177,901.            Specification of Letters Patent.        Patented Apr. 4, 1916.

Original application filed October 31, 1912, Serial No. 728,790. Divided and this application filed September 23, 1914. Serial No. 863,099.

*To all whom it may concern:*

Be it known that I, JULIUS SCHUMAN, a citizen of the United States, residing at Los Angeles, in the county of Los Angeles, State of California, have invented new and useful Improvements in Measuring Instruments, of which the following is a specification.

This invention relates to measuring instruments; and this application contains subject matter divisional from my application Serial No. 728,790 filed Oct. 31, 1912.

In my former application I have described a complete tailor's measuring instrument adapted for universal use and adapted to take all of the measurements required for men's and women's garments. In this application I wish to describe and claim those certain parts of the complete structure which relates particularly to taking waist and skirt and trousers measures and the like.

In its preferred form, my measuring instrument embodies a flexible extensible and contractible waist belt adapted to be placed around the waist and adjusted to proper length. I use an extensible standard whose lower end rests upon the floor, and I provide means for attaching the upper end of this extensible standard to the waist belt. The standard is preferably flexible so as to conform to the contour of a skirt or the like; and I provide a means for measuring the height of the standard from the floor. In its preferred form, I provide said means by having a holder or pocket for a steel tape measure, which tape measure is graduated so as to show the height of the upper end of the standard above the floor, thereby showing the height of the waist line above the floor.

The particulars of my invention will be readily apparent from the following specification and accompanying drawings wherein I have shown preferred forms of my device, and in which drawings, Figure 1 is a perspective showing my device in use, Fig. 2 is a perspective showing one approved form of the vertical standard of the device, Fig. 3 is a perspective showing another form of the same, Fig. 4 is a section taken as indicated by line 4—4 of Fig. 3, Fig. 5 is a section taken as indicated by line 5—5 of Fig. 3, Fig. 6 is a perspective showing my preferred form of waist belt, Fig. 7 is a detail view showing the construction of said waist belt.

In the drawings the numeral 10 may designate any convenient base upon which my vertical standard 11 may be mounted; and this base may also be the foundation upon which other parts of my complete measuring instrument are mounted. The vertical standard 11 is preferably formed as shown in the drawings, of a lower member 12 and an upper member 13, both of these members being preferably of flexible flat strip metal so that the standard may be bent as shown in Fig. 1 to conform to the contour of a skirt or the like. The lower member 12 may have guide bearings 15 through which the upper member 13 may be slidably adjustable, a set screw 16 being employed for holding the upper member in any set position.

The height, or vertical length, of the standard may be scaled in any approved manner; linear scales may be applied to the members in any such manner as will indicate the vertical length of the standard. In my preferred form I have scales as shown.

The upper end of upper member 13 has a curved clip 17 adapted to hold the case 18 of the steel tape measure. The tape 19 may be attached at its lower end to the lower member 12 in any preferred manner. In the form shown in Fig. 2 I have shown a lower tape 20 which is pulled out of the tape case 21 held in a box 22 on the base 10. This lower tape passes through guides 23 and has a ring 24 on its upper end which prevents the upper end from being pulled down below the uppermost guide 23. The lower end of the upper tape 19 is then hooked through this ring 24. In this case the two tapes are graduated so as to read continuously from the bottom up; so that the reading of the height of the standard is always at the upper end where it can be seen without stooping.

In Fig. 3 I have shown a form wherein the lower end of the upper tape 19 is hooked into the upper end of the lower standard member 12. The tape is graduated so that the reading directly under the tape case 18 will always indicate the height of the standard up to the socket 26. The socket 26 is of the usual spring character and is adapted to receive a knob 27, or the like, mounted upon the waist belt 28. This waist belt may be provided with a series of knobs 29 and with a spring socket 30, so that the belt may be adjusted about the waist to the proper tightness. The linear scale divisions 31 on the belt are arranged so that the length of the belt may be always read directly at the end carrying the socket 30. The knobs 29 are placed in such position relative to the linear scale, and the socket 30 in such position at the end of the belt, that the reading of the scale at the socket end of the belt will always give the length of the belt in any position of adjustment. The socket 26 of the vertical standard may be attached to any of the knobs 29 or may be attached to the special knob 27 provided for that purpose. The belt 28 carries two or more depending strips 32 and 33, the strip 32 having a clip 34 at its lower end adapted to receive a tape case 35, the tape 36 of which is adapted to encircle the hips so as to measure the hip circumference. The strip 33 has a supporting hook 37 on its lower end through which the tape may be passed so as to be supported in proper position to take the proper measurements.

It will be noted that the height of the waist line is taken along the skirt or trousers contour, so that the length of the skirt or trousers is thereby ascertained. The distance of the bottom of skirt or trousers from the floor is ascertained in another manner, or may be determined by reference to the lower tape on the flexible standard.

The use of all the devices described herein is illustrated in Fig. 1. It will be seen that the measures described can be easily and readily taken with great accuracy. The height of the waist and hip lines from the floor may be readily and easily determined without stooping, the height of the waist line being read directly on the tape 19 and the height of the hip line being a certain known distance from the waist line. The waist belt may be adjusted to the person being measured and may be worn throughout the measuring process so that the person can accurately determine whether it is of the right tightness. The releasable connection between the vertical standard and the belt allows the belt to be detached from the standard and to be worn during the complete measuring process.

I do not wish to limit myself to the specific forms and structures illustrated and described herein. There are many modifications which will suggest themselves to persons skilled in the art; among which I call attention to modification of the means for measuring the height of the vertical standard to the waist line. The means I show are merely a specific preferred form.

Having described my invention, I claim:

1. In a tailor's measuring instrument, a vertically extensible flexible standard embodying lower and upper flexible flat strip members, the upper member being vertically slidable on the lower member, a tape measure carried at the upper end of the upper member and its lower end being brought down and secured to the lower member, linear markings on said tape to indicate the height of the upper end of the upper member from the floor, a waist belt, and means for attaching the upper end of the upper standard member to the waist belt.

2. In a tailor's measuring instrument, a vertically extensible flexible standard embodying lower and upper flexible flat strip members, the upper member being vertically slidable on the lower member, a tape measure carried at the upper end of the upper member and its lower end being brought down and secured to the lower member, linear markings on said tape to indicate the height of the upper end of the upper member from the floor, a waist belt of flexible material with linear scale markings, a plurality of knobs and a socket on the belt whereby the belt may be held in any position desired, and means for attaching the upper end of the upper standard member to the belt embodying a knob on the belt and a socket on said upper end.

3. In a device of the character described, a waist belt, a base, a vertical flexible extensible standard thereon, said standard comprising a plurality of members slidable on each other and all of said members being flexible so as to be comformable to a skirt contour, means for attaching the upper end of the uppermost member to the waist belt, and means for indicating the height of the waist belt above the floor, substantially as described.

4. In a device of the character described, a waist belt, a base, a vertical flexible extensible standard thereon, said standard comprising a plurality of members slidable on each other and all of said members being flexible so as to be comformable to a skirt contour, means for attaching the upper end of the uppermost member to a waist belt, and means for indicating the height of the waist belt above the floor, said means embodying a socket at the upper end of the uppermost member, a tape case removably mounted in said socket, and a tape in said case extended and connected to the lowermost member, substantially as described.

In witness that I claim the foregoing I have hereunto subscribed my name this 16th day of September, 1914.

JULIUS SCHUMAN.

Witnesses:
W. L. CONNOR,
E. B. ARMSTRONG.

Copies of this patent may be obtained for five cents each, by addressing the "Commissioner of Patents, Washington, D. C."